INVENTOR.
Frederic R. Quinn

United States Patent Office 3,451,217
Patented June 24, 1969

3,451,217
FLUID CONTROL SYSTEM
Frederic R. Quinn, Red Hook, N.Y., assignor to Zyrotron Industries, Inc., South Hackensack, N.J.
Filed Jan. 10, 1968, Ser. No. 696,880
Int. Cl. F15b 15/18, 21/02
U.S. Cl. 60—52                    17 Claims

ABSTRACT OF THE DISCLOSURE

A fluid control system for a fluid operated device including an AC operated fuel pump which is connected to the device by a conduit and a DC operated solenoid valve for controlling the flow of the fluid through the conduit. A silicon controlled rectifier controlled full wave rectifier bridge is provided for connecting the pump with an AC source of energy and for supplying the rectified current to the valve when gated. Gating means mounted on the device is adapted to selectively render the silicon controlled rectifier conductive when operated to provide a compact and economic system for controlling the operation of the device.

---

This invention relates generally to improvements in fluid control systems and, more particularly, pertains to a fluid control system which includes the single control circuit for energizing an AC load and a DC load.

Control systems for fluid operated devices, such as rivet guns have presented many problems in the past. For example, the fluid pump used in such systems is usually AC operated, whereas the solenoid valve controlling the flow of the fluid is usually DC operated. Hence, complicated electro-mechanical switching and rectifying arrangements are utilized to energize the valve and the pump. Accordingly, such systems are found to be relatively expensive and, because of the many moving elements in the systems, are further found to be subject to frequent breakdowns. This particular problem is compounded even further by the fact that all repairs must be made in the field and, until such repairs are made, the device remains out of service.

Accordingly, an object of the present invention is to provide a control system for a fluid operated device which is simple in construction and economic to manufacture.

A further object of this invention is to provide a fluid control system which contains relatively few mechanical elements and which is extremely easy to service.

Another object and feature of the present invention resides in the novel details of construction which provide a fluid control system of the type described which includes a single control circuit for energizing an AC operated fluid pump and a DC operated solenoid valve.

A further object of the invention is the provision of a fluid control system which is extremely reliable in operation.

In conventional fluid systems such as those associated with rivet guns, the fluid pump and control valve are located remote from the gun whereas the actuating switch for the system is positioned directly on the gun. Thus, a further object of the present invention is to provide a fluid control system which may be actuated by a signal having a relatively low amplitude thereby to eliminate the application of high voltages to the rivet gun or fluid operated device.

An additional object of this invention is to provide a single control circuit for selectively and simultaneously energizing AC and DC operated loads.

Accordingly, a fluid control system constructed in accordance with the present invention includes an AC operated fuel pump and a conduit connecting the fuel pump with the device to be operated. A DC operated solenoid valve is provided for controlling the flow of a fluid through the conduit. A silicon controlled rectifier controlled full-wave rectifier bridge means is adapted to connect an AC source of potential in series with said fuel pump and to supply a DC current to the valve when gated. Gating means is connected to the gate electrode of the silicon controlled rectifier and is selectively operable to cause the silicon controlled rectifier to be conductive thereby to energize the pump and the valve.

Other features and advantages of the present invention will become more apparent from a consideration of the following detailed description when taken in conjunction with the accompanying drawings, in which.

While the system of the present invention will be described in conjunction with the operation of a fluid operated rivet gun, it is to be emphasized that this is by way of example only and is not to be interpreted as a limitation on the present invention. That is, the fluid control system of the present invention may be utilized in conjunction with any fluid operated device and the control circuit may be used to energize any AC and/or DC load.

Figure 2:
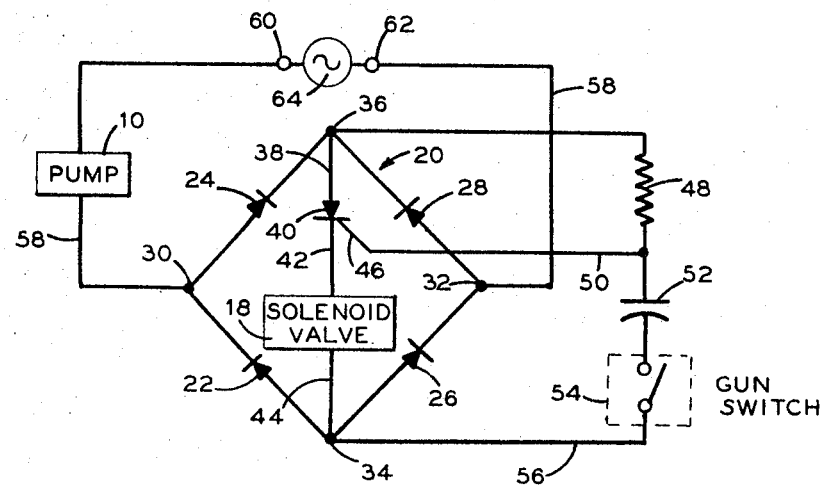
FIG. 2 is a schematic circuit wiring diagram of the control circuit of the present invention.
Figure 1:
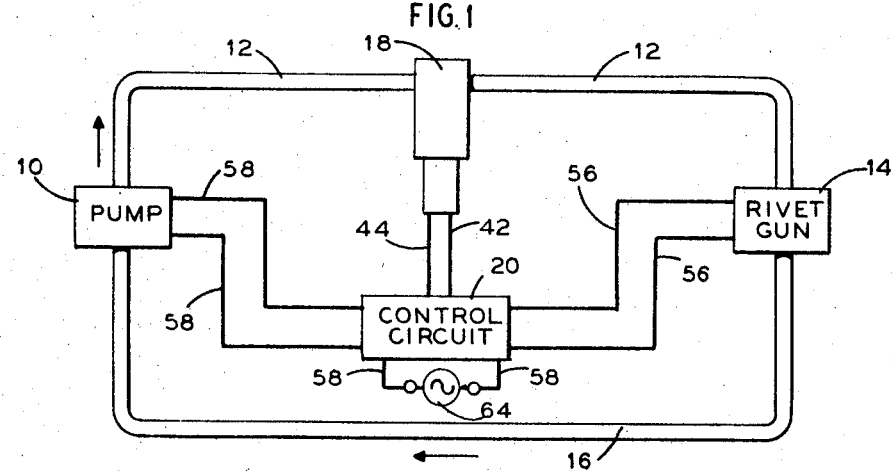
FIG. 1 is a block diagram of a fluid control system constructed in accordance with the present invention, as applied to a fluid operated rivet gun.

As shown in FIG. 1, the fluid control system of the present invention includes a fluid pump 10 which is adapted to pump a fluid under pressure through a conduit 12 to a rivet gun 14. The fluid is returned from the rivet gun 14 to the pump 10 by a conduit 16. The conduits 12 and 16 are relatively flexible conduits such as a hose or the like so that the rivet gun 14 may be positioned at a location which is remote from the pump 10. In other words, the pump 10 may be located at ground level whereas the rivet gun 14 is usually located a number of stories above the pump 10, such as when the rivet gun is utilized in building construction.

The operation of the rivet gun 14 is conventional and will not be described in great detail herein. The front portion of the rivet gun is normally placed over a rivet and, when the fluid under pressure is applied to the gun 14, a hammer within the gun strikes the rivet thereby deforming the end of the rivet so that the rivet is maintained in place on the structure through which it extends. Application of the fluid to the rivet gun is controlled by a DC operated solenoid valve 18 which is connected in the conduit 12. Usually, the valve 18 is positioned adjacent the pump 10. Thus, when the valve 18 is energized the valve opens to permit fluid to flow through the conduit 12 to the rivet gun 14. On the other hand, when the valve 18 is de-energized the valve closes to prevent fluid flow to the rivet gun 14.

Due to the fact that the solenoid valve 18 was DC operated and pump 10 was AC operated, elaborate switching arrangements and rectifying devices have been utilized heretofore in systems of the type disclosed to respectively energize the pump 10 and the valve 18. Moreover, these switching arrangements were electro-mechanical in nature and were subject to frequent breakdowns thereby rendering the system useless. However, in accordance with the present invention, a single control circuit designated generally by the reference numeral 20 in the figures is utilized to control the energization of the pump 10 and the valve 18.

More specifically, the control circuit 20 is a silicon controlled rectifier controlled full wave rectifier bridge comprising a first pair of diodes 22 and 24 and a second pair of diodes 26 and 28. The first pair of diodes 22 and 24 are serially connected together to form a junction 30. The cathode electrode of the diode 22 is connected to the anode electrode of the diode 24 so that the diodes 22 and 24 conduct current in the same direction. Similarly, the diodes 26 and 28 are connected together to form a junction 32. The cathode electrode of the diode 26 is connected to the anode electrode of the diode 28, so that the diodes 26 and 28 also conduct current in the same direction. The pair of diodes 22, 24 are connected in parallel with a pair of diodes 26, 28 to form respective junctions 34 and 36. Moreover, the cathode electrodes of the diodes 24 and 28 are connected together and the anode electrodes of the diodes 22 and 26 are connected together so that current flow will be from the junction 34 to the junction 36 through the respective diodes which form the arms of the bridge.

Connected to the junction 36 by a lead 38 is the anode electrode of a silicon controlled rectifier 40. The cathode electrode of the silicon controlled rectifier or SCR 40 is connected to one side of the solenoid valve 18 by a lead 42. The other side of the valve 18 is connected to the junction 34 by a lead 44. In other words, the SCR 40 is connected in series with the solenoid valve 18 between the junctions 34 and 36 of the diode bridge.

Actuating means is connected to the gate electrode 46 of the SCR 40 to apply a gating signal to the SCR to render the SCR conductive. More specifically, a resistor 48 is connected between the junction 36 and the gate electrode 46 of the SCR 40 by a lead 50. Additionally, the gate electrode 46 is connected to the junction 34 through a series circuit comprising a capacitor 52 and a normally open single-pole single-throw switch 54 by a lead 56. The switch 54 is normally positioned on the rivet gun 14 and is connected between the capacitor 52 and the junction 34 by a relatively long lead so that the rivet gun 14 may be positioned at a location removed from the control circuit 20.

Connected between the junctions 30 and 32 by a lead 58 is a series circuit comprising the pump 10 and a pair of input terminals 60 and 62. Connected between the terminals 60 and 62 is an AC source of energy or potential 64. In practice, the pump 10, the valve 18 and the control circuit 20 may be located in the same housing to provide a compact unit, while the switch 54 is connected thereto by a relatively long lead, as noted hereinabove.

In operation, the source 64 is connected between the terminals 60 and 62. However, with the SCR in its nonconducting state no current will flow through the bridge circuit so that the pump 10 and the solenoid valve 18 will remain de-energized. When the switch 54 is operated to the closed position, a gating signal will be applied between the gate electrode 46 and the cathode electrode of the silicon controlled rectifier 40 thereby to bias the SCR into conduction. If, at this time, the junction 30 is positive with respect to the junction 32, current will flow from the source 64, through the pump 10, to diode 24, the SCR 40, the solenoid valve 18, and the diode 26 back to the source 64. On the other hand, when the junction 32 becomes positive with respect to the junction 30 current will flow from the source 64 to the diode 28, the SCR 40, the solenoid valve 18, the diode 22 and the pump 10 back to the source of energy 64. Hence, alternating current will flow through the pump 10 thereby to energize the pump whereas the current flowing through the solenoid valve 18 will be in a single direction from the junction 36 to the junction 34 thereby to provide DC current through the solenoid 18. When the switch 54 is moved to the open position the SCR will be rendered non-conductive, thereby de-energizing the solenoid valve 18 and the pump 10 to stop the flow of the fluid to the rivet gun 14.

Accordingly, a fluid control system has been disclosed which includes a single control circuit for selectively energizing a DC load such as solenoid valve 18 and an AC load such as the pump 10. It is to be noted that no mechanical elements are utilized in the control circuit 20 thereby eliminating the possibility of breakdowns which may occur due to mechanical failure of moving parts. Additionally, the control circuit 20 is simple to service. Moreover, the entire control circuit 20 may be replaced in the field if any one of the unidirectional conducting devices fail, thereby reducing the time that the control system will be out of operation. Additionally, it should be noted that the SCR may be gated by a relatively small potential so that no high voltages are applied to the switch 54 and, therefore, the rivet gun 14.

Figure 3:
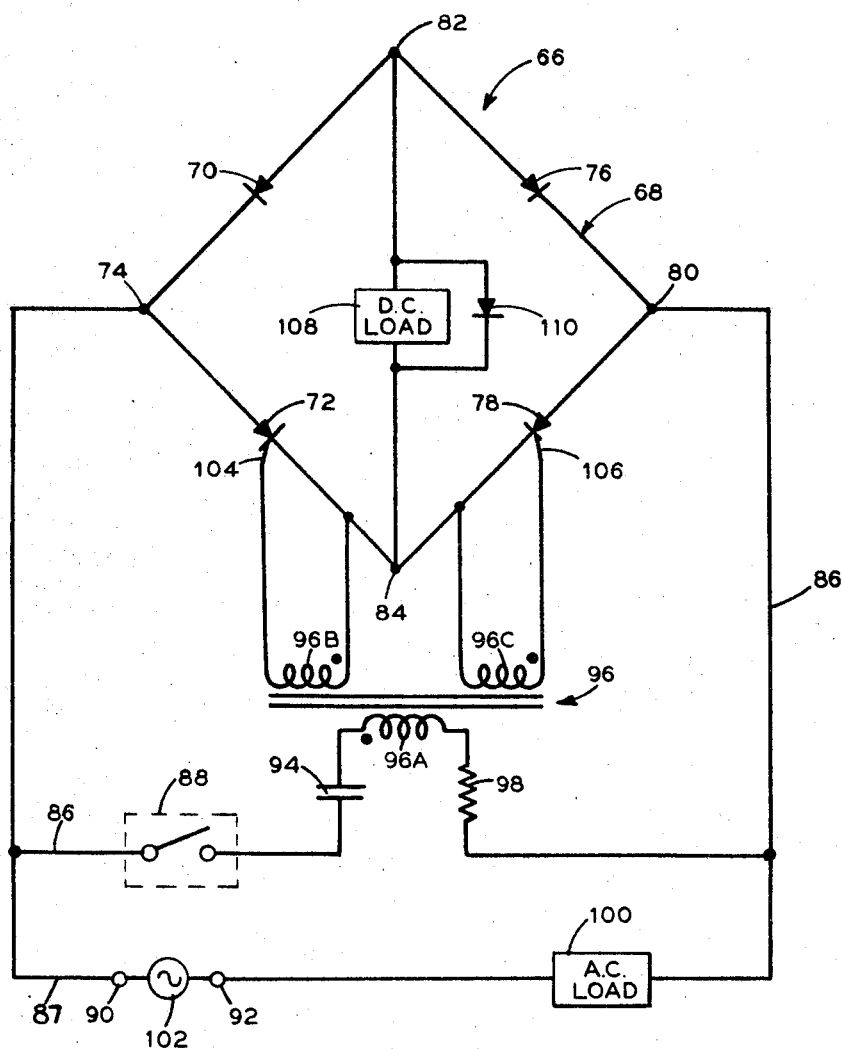
FIG. 3 is a schematic circuit wiring diagram of a modified embodiment of a control circuit.

FIG. 3 illustrates a modified embodiment of a control circuit, designated generally by the reference numeral 66, constructed according to the present invention. The circuit 66 similarly includes a silicon controlled rectifier controlled full-wave rectifier bridge 68 which is adapted to energize an AC and/or a DC load from a single AC source of energy.

Accordingly, the bridge 68 includes a semiconductor diode 70 and a silicon controlled rectifier 72 which are connected together at a junction 74. The bridge 68 further includes a semiconductor diode 76 and a silicon controlled rectifier 78 which are connected together at a junction 80. The series circuit comprising the diode 70 and SCR 72 is connected in parallel with the series circuit comprising the diode 76 and the SCR 78 at junctions 82 and 84. As shown in FIG. 3, the diodes 70, 76 and the silicon controlled rectifiers 72, 78 are polarized to conduct current from the junction 82 to the junction 84.

Connected between the junctions 74 and 80 by a lead 86 is a series circuit comprising a single-pole single-throw switch 88, a capacitor 94, the primary winding 96A of a transformer 96, and a current limiting resistor 98. Also connected between the junctions 74 and 80 by a lead 87 is a series circuit comprising input terminals 90, 92 and an AC load 100. An AC source of energy 102 is connected between the terminals 90, 92. The transformer 96 is operable to drive the silicon controlled rectifier 72, 78 into conduction on alternate half-cycles of the input AC waveform to render the bridge 68 conductive.

More specifically, the transformer 96 includes two secondary windings 96B and 96C. The winding 96B is connected between the gate electrode 104 and the cathode electrode of the silicon controlled rectifier 72. Similarly, the secondary winding 96C is connected between the gate electrode 106 and the cathode electrode of the silicon controlled rectifier 78. As shown in FIG. 3, the secondary windings 96B and 96C are polarized to gate the respective silicon controlled rectifier into conduction on alternate half-cycles of the input AC waveform so that the bridge 68 remains continuously conductive as long as the switch 88 remains closed.

Connected between the junctions 82 and 84 is a DC load 108. If the load 108 is inductive, a free wheeling diode 110 may be connected across the load. As is conventional, the diode 110 is polarized to oppose normal current flow through the load 108.

In operation, when it is desired to energize the AC load 100 and the DC load 108 the switch 88 is closed. Since the transformer 96 is in inductive load the potential of the source 102 appears across the windings thereof. Accordingly, depending on the polarity of the waveform at the instant the switch 88 is closed, either the silicon controlled rectifier 72 or 78 will be gated into conduction. If it is assumed that SCR 72 initially conducts current, then a current will flow from the source 102 through the circuit comprising SCR 72, DC load 108, diode 76, and AC load 100 back to the source 102. Current will also flow to the circuit comprising resistor 98, transformer 96, capacitor 94, and the switch 88. One-half cycle later the polarity of the input waveform will reverse thereby gating the SCR 78 into conduction. Hence a current will now flow from the source 102 through the circuits comprising: the switch 88, capacitor 94, transformer 96, and resistor 98; and AC load 100, SCR 78, DC load 108, diode 70 back to the source 102.

Thus, the current which flows through the DC load 108 is always in the same direction. Hence, the control circuit 66 similarly provides a means for simultaneously energizing AC and DC loads from a single AC source without the utilization of moving parts such as contact tips and the like. Moreover, it should be noted that the circuit requires very little potential, about 12 volts, to initiate conduction of the silicon controlled rectifier 72 and 78. Accordingly, this low potential substantially eliminates any possibility of arcing at the switch 88.

While preferred embodiments of the present invention have been shown and described herein it will be obvious that numerous omissions, changes and additions may be made in such embodiments without departing from the spirit and scope of the present invention.

What is claimed is:

1. A fluid control system including a fluid operated device, an AC operated fluid pump, fluid conduit means connecting said pump with said device, a DC operated solenoid valve connected in series with said conduit means for controlling the flow of a fluid from said pump to said device; and a control circuit for actuating said pump and said valve, said control circuit comprising a pair of terminals adapted to be connected to an AC source of potential, a full-wave rectifier bridge having a first pair of junctions defining one diagonal and a second pair of junctions defining another diagonal, first lead means for connecting said pump in series with said pair of terminals between said first pair of junctions, and second lead means for connecting said valve between said second pair of junctions, said bridge including at least one selectively operable unidirectional current conducting means having a control electrode for rendering said bridge conductive to permit AC current flow between said first pair of junctions and DC current flow between said second pair of junctions in response to an actuating signal applied to said control electrode, and actuating means for applying an actuating signal to said control electrode.

2. A fluid control system as in claim 1, in which said unidirectional conducting means comprises a silicon controlled rectifier having an anode, a cathode and a gate electrode, said second lead means connecting said anode and cathode electrodes between said second pair of junctions through said valve.

3. A fluid control system as in claim 2, in which said actuating means includes a signal source, and a switch movable between an open and a closed position.

4. A fluid control system as in claim 3, in which said signal source includes a resistor connected between said anode and gate electrodes, and a capacitor connected in series with said switch between said gate and cathode electrodes.

5. A fluid control system as in claim 1, in which said fluid operated device comprises a rivet gun adapted to hammer rivets when a fluid is applied thereto.

6. A fluid control system as in claim 1, in which said rectifier bridge includes a first and a second silicon controlled rectifier each having an anode, a cathode and a control electrode, the anode-cathode electrodes of said first silicon controlled rectifier being connected between one of said first pair of junctions and one of said second pair of junctions, the anode-cathode electrodes of said second silicon controlled rectifier being connected between the other of said first pair of junctions and said one of said second pair of junctions, and said actuating means being connected between the respective control and cathode electrodes of said first and second silicon controlled rectifiers.

7. A fluid control system as in claim 6, in which said actuating means includes a transformer having a primary winding and a pair of secondary windings, said first lead means connecting said primary winding between said first pair of junctions, and third lead means for connecting one of said pair of secondary windings between the control and cathode electrodes of said first silicon controlled rectifier and for connecting the other of said pair of secondary windings between the control and cathode electrodes of said second silicon controlled rectifier, said pair of secondary windings being oriented to render the respective first and second silicon controlled rectifiers conductive on alternate half-cycles of an alternating current waveform applied between said pair of input terminals.

8. A control circuit for selectively energizing an AC and a DC operated load; said control circuit comprising a first pair of unidirectional conducting devices connected together at a first junction and polarized to conduct a current in the same direction; a second pair of unidirectional conducting devices connected together at a second junction and polarized to conduct a current in the same direction, first lead means for connecting said first pair of unidirectional conducting devices to form third and fourth junctions so that current flow is from said third to said fourth junction through said first and second pairs of devices; second lead means adapted to serially connect an AC source of energy and an AC load between said first and second junctions; unidirectional conducting means having an input, an output and a control electrode for rendering said unidirectional conducting means conductive in response to a control signal applied between said control and input electrodes; third lead means for serially connecting the input-output path of said unidirectional conducting means and a DC load between said third and fourth junctions; and actuating means connected to said control electrode for selectively applying a signal to said control electrode to render conductive said unidirectional conducting means.

9. A control circuit as in claim 8, in which said unidirectional conducting means comprises a silicon controlled rectifier having an anode electrode corresponding to said output electrode, a cathode electrode corresponding to said input electrode and a gate electrode corresponding to said control electrode; said third lead means connecting said anode electrode to said fourth junction and said cathode electrode to said third electrode.

10. A control circuit as in claim 9, wherein said actuating means comprises a first impedance connected between said fourth junction and said gate electrode, and a series circuit comprising a second impedance and a switch operable between open and closed states connected between said gate electrode and said third junction.

11. A control circuit as in claim 8, in which said first and second pairs of unidirectional conducting devices comprise diodes.

12. A fluid control system for a fluid operated device including an AC operated fuel pump, a fluid conduit connecting said fuel pump with the device, a DC solenoid operated fuel control valve for controlling the flow of a fluid through said conduit, a silicon controlled rectifier controlled full-wave rectifier bridge means for connecting an AC source of potential in series with said fuel pump, and for supplying DC current to said solenoid valve when gated, and gating means connected to the gate of said silicon controlled rectifier so as to cause said silicon controlled rectifier to be conductive when said gating means is operated.

13. A fluid control system as in claim 12, in which said gating means includes a switch adapted to be located on the fluid operated device and being operable to apply a gating signal to said gate.

14. A fluid control system as in claim 12, wherein said bridge means comprises solid state unidirectional conducting devices.

15. A control circuit for selectively energizing AC and DC operated loads; said control circuit comprising first and second unidirectional conducting devices connected together at a first junction and polarized to conduct a current in the same direction; third and fourth unidirectional conducting devices connected together at a second junction and polarized to conduct a current in the same direction; first lead means for connecting said first and second unidirectional conducting devices in parallel with said third and fourth unidirectional conducting devices to form third and fourth junctions whereby current flow is from said third to said fourth junctions through said devices; said second and fourth unidirectional conducting devices each having an anode electrode, a cathode electrode and a gate electrode and each being responsive to a respective gating signal applied to said gate electrode to drive said device into conduction; second lead means for connecting an AC souce of energy and an AC load between said first and second junctions; third lead for connecting a DC load between said third and fourth junctions; and gating means for selectively applying gating signals to said second and fourth unidirectional conducting devices on alternate half-cycles of the AC source of potential to render said second and fourth unidirectional conducting devices alternately conductive.

16. A control circuit as in claim 15, in which said second and fourth unidirectional conducting devices comprise silicon controlled rectifiers, and said first and third unidirectional conducting devices comprise semiconductor diodes.

17. A control circuit as in claim 15, in which said gating means includes a transformer having a primary winding and a pair of secondary windings, said second lead means connecting said primary winding with the AC source of potential, and lead means for connecting one of said pair of secondary windings between the gate and cathode electrodes of said second unidirectional conducting device and for connecting the other of said secondary windings between the gate and cathode electrodes of said fourth unidirectional conducting device, said pair of secondary windings being oriented to drive the respective second and fourth unidirectional conducting devices into conduction on alterate half-cycles of the AC source of potential, and switch means for selectively connecting and disconnecting said primary winding and the AC source of potential.

No references cited.

EDGAR W. GEOGHEGAN, *Primary Examiner.*